United States Patent [19]

Krogsrud

[11] 4,116,830

[45] Sep. 26, 1978

[54] METHOD OF TREATING WET-WASHED SILICA DUST

[75] Inventor: Harald Krogsrud, Gjettum, Norway

[73] Assignee: Elkem-Spigerverket A/S, Oslo, Norway

[21] Appl. No.: 789,865

[22] Filed: Apr. 22, 1977

[30] Foreign Application Priority Data

Apr. 23, 1976 [NO] Norway .................................. 761383

[51] Int. Cl.$^2$ ................................................ C02C 5/06
[52] U.S. Cl. .................................... 210/63 R; 55/89; 210/67; 210/71
[58] Field of Search .................... 55/89, 228; 210/50, 210/56, 59, 63 R, 67, 71

[56] References Cited

U.S. PATENT DOCUMENTS

| 2,134,679 | 11/1938 | Allen | 210/63 R X |
|---|---|---|---|
| 2,401,924 | 6/1946 | Goetz | 210/56 X |
| 2,863,727 | 12/1958 | Thornhill et al. | 210/67 X |
| 3,272,740 | 9/1966 | Gitchel et al. | 210/50 X |
| 3,320,906 | 5/1967 | Domahidy | 55/89 X |
| 3,442,498 | 5/1969 | Davis | 210/67 X |
| 3,490,204 | 1/1970 | Kalika | 55/228 X |
| 3,962,080 | 6/1976 | Dulin et al. | 210/42 R X |
| 4,036,606 | 7/1977 | Zimmermann et al. | 55/89 X |

*Primary Examiner*—Thomas G. Wyse
*Assistant Examiner*—Robert H. Spitzer
*Attorney, Agent, or Firm*—Eyre, Mann, Lucas & Just

[57] ABSTRACT

A method of treating the silica dust recovered from waste gasses by wet-washing of the gasses is disclosed. The sludge material is charged to a rotary kiln at a temperature of 800° – 1,400° C. in the presence of an oxidizing or reducing agent whereby the sludge is converted to pellets while phenols and cyanides are simultaneously treated.

5 Claims, No Drawings

METHOD OF TREATING WET-WASHED SILICA DUST

The present invention relates to treatment of the sludge obtained by wet washing waste gasses generated in metallurgical furnaces for the production of materials high in silicon content such as silicon or silicon-containing alloys having a silicon content of at least about 50%.

As is well known in the art, the electric smelting furnaces used to produce silicon and silicon-containing alloys generate a great deal of waste gasses which contain finely divided dust. Because of environmental considerations, it is necessary that these dusts be removed from the waste gasses before the waste gasses are released to the atmosphere.

There are many known systems for recovering the dust from the waste gasses. These include both dry processes and wet processes. In either case, it is necessary to dispose of the material recovered from the waste gasses, which material is itself a pollutant, so that the pollution problem has really been transferred from the smokestack to the filtering system rather than solved.

The present invention is particularly concerned with treatment of the liquid recovered from wet-washing of the smokestack gasses. When wet washing is employed, there is obtained a sludge which is predominately silica but which will also frequently contain oxides of aluminum, iron, calcium and/or magnesium, the quantity of each depending to a great degree on the particular alloy being produced. In any case, however, the sludge will also contain cyanides and phenols which, because of their toxic nature, make it environmentally impossible to dispose of the sludge directly. The cyanides and phenols also make it difficult to agglomerate and dry the sludge and return the recovered solids to the smelting process.

The inventor has now found an effective method of treating the sludge obtained from wet washing of the waste gasses from smelting furnaces for the production of silicon or silicon-containing alloys. In accordance with the present invention, the sludge is converted to pellets while at the same time it is treated for the cyanides and phenols to render them harmless. The pellets obtained are strong enough to be disposed of without dusting problems or to be returned to the smelting process as part of the charge for making additional silicon or silicon-containing alloys.

In the process of the present invention, the sludge is supplied to a rotary kiln which is at a temperature of up to about 500° C. The sludge is maintained at this temperature until substantially all of the water is removed. The temperature of the sludge is then raised to from about 800° C. to about 1,400° C. and the atmosphere in the rotary kiln is charged with either an oxidizing or reducing agent. Because of the presence of the oxidizing or reducing agent in the kiln and the high temperatures involved, the cyanides and phenols are rendered harmless while at the same time the pellets are formed and burned in the rotary kiln. This is a very substantial process advantage over known techniques of first treating the sludge to render to cyanides and phenols harmless and thereafter pelletizing the sludge material.

In addition to the foregoing advantages, the process of the present invention also has advantage where the silicon or silicon-containing alloy is being produced in a smelting furnace employing Soderberg electrodes, wherein tar components are also produced and are present in the sludge. These tar components will be combusted and thus will be rendered harmless by the treatment according to the present invention.

The time of residence of the sludge in the rotary kiln operated at a temperature of up to about 500° C. is not at all critical. It need only be long enough to dry the sludge to a substantial degree, suitably to a moisture content below about 5%. The exact time that will be required to accomplish this will, obviously, be dependent upon the amount of water in the sludge and the particular temperature used in the rotary kiln. Thereafter, the temperature of the sludge is raised to between 800° C. and 1,400° C. in an oxidizing or reducing atmosphere. Again, the time of residence is not critical so long as it is sufficient to render a substantial portion of the phenols and cyanides harmless, suitably until at least about 75% of them have been oxidized or reduced and to burn the pellets to a sufficient degree so that they have structural integrity.

In one example according to the present invention, a sludge was treated which contained 70% water, 4% tar and the balance solids. The solids content comprised 87% silica, 2.6% alumina, 1.4% calcium oxide, 1.3% magnesia, 2.5% ferric oxide, 3.6% carbon (this includes the carbon present in the tar) and 1.0% sulfur (this also includes the sulfur present in the tar). The sludge also contained 28 ppm of phenols and 37 ppm of cyanides.

The sludge was first preheated to a temperature of about 300° C. and was then charged to a rotary kiln where the temperature of the sludge was slowly raised to 400° C. and was maintained at that temperature until all of the water had been expelled. Thereafter, the temperature in the rotary kiln was raised to 800° C. and there was a simultaneous injection of air in order to obtain an oxidizing atmosphere. The pellets which were produced were measured and it was found that the cyanide content in the pellets was reduced to 3 ppm and there were no remaining traces of phenols. The pellets produced had over 90% with a diameter of 3-15 mm and only 5% were below 1 mm. The dust content in the off gas from the rotary kiln was very low and constituted only about 0.5% by weight of the solids materials charged to the rotary kiln.

The above process was repeated except that in the second instance the temperature in the rotary kiln was raised to 1,400° C. This resulted in substantially improved strength of the pellets and, in addition, the carbon in the sludge was combusted as were the tar components.

It will be understood that the claims are intended to cover all changes and modifications of the preferred embodiment of the invention, herein chosen for the purpose of illustration, which do not constitute departure from the spirit and scope of the invention.

What is claimed is:

1. A process for treating the waste gasses generated from metallurgical furnaces for the production of materials high in silicon content comprising:
   (a) wet-washing the waste gasses whereby a sludge is obtained comprising silica dust, phenols and cyanides;
   (b) introducing the sludge to a rotary kiln;
   (c) heating the sludge at temperatures not in excess of about 500° C. until substantially all of the water is driven off from the sludge;
   (d) thereafter raising the temperature of the sludge in the rotary kiln to from about 800° C. to about 1,400° C. while simultaneously treating it with an agent selected from the group consisting of those oxidizing and reducing agents capable of rendering phenols and cyanides harmless;

(e) continuing the heating of step (d) until a substantial portion of the phenols and cyanides are rendered harmless;

(f) and wherein pellets comprising silica dust are formed by the rotary action of the rotary kiln at the elevated temperatures of step (d).

2. The process of claim 1 wherein the sludge is preheated before it is introduced into the rotary kiln.

3. The process of claim 1 wherein the agent of step (d) is an oxidizing agent.

4. The process of claim 3 wherein the oxidizing agent is air.

5. The process of claim 1 wherein the sludge also contains tar and wherein the heating of steps (d) and (e) is at a temperature high enough to combust the tar.

* * * * *